(12) United States Patent
Miyazawa

(10) Patent No.: US 12,022,191 B2
(45) Date of Patent: Jun. 25, 2024

(54) IMAGING DEVICE AND CONTROL METHOD THEREOF

(71) Applicant: CANON KABUSHIKI KAISHA, Tokyo (JP)

(72) Inventor: Hitoshi Miyazawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/047,602

(22) Filed: Oct. 18, 2022

(65) Prior Publication Data

US 2023/0127736 A1 Apr. 27, 2023

(30) Foreign Application Priority Data

Oct. 22, 2021 (JP) ................................ 2021-173040

(51) Int. Cl.
*H04N 23/68* (2023.01)
*H04N 23/62* (2023.01)
*H04N 23/67* (2023.01)

(52) U.S. Cl.
CPC ........... *H04N 23/683* (2023.01); *H04N 23/62* (2023.01); *H04N 23/675* (2023.01); *H04N 23/6811* (2023.01)

(58) Field of Classification Search
CPC .... H04N 23/683; H04N 23/62; H04N 23/675; H04N 23/6811; H04N 23/667; H04N 23/61; H04N 23/6815; H04N 23/687
See application file for complete search history.

(56) References Cited

U.S. PATENT DOCUMENTS

| 10,623,645 | B2 | 4/2020 | Haruna | |
|---|---|---|---|---|
| 2006/0153472 | A1* | 7/2006 | Sakata | H04N 23/68 382/255 |
| 2014/0320682 | A1* | 10/2014 | Kuwabara | G06T 5/003 348/208.6 |
| 2017/0280060 | A1* | 9/2017 | Sugita | G02B 7/14 |
| 2019/0265734 | A1* | 8/2019 | Liu | G06T 7/248 |

FOREIGN PATENT DOCUMENTS

JP 2019078843 A 5/2019

\* cited by examiner

*Primary Examiner* — Mekonnen D Dagnew
(74) *Attorney, Agent, or Firm* — Canon U.S.A., Inc. IP Division

(57) ABSTRACT

A camera microcomputer of an imaging device determines a feature region of an object according to information on a moving direction of the object with respect to the imaging device. Then, the camera microcomputer determines a reference region for correcting image blur related to the object on the basis of a motion vector of the object related to the feature region obtained on the basis of a motion between a plurality of images.

22 Claims, 9 Drawing Sheets

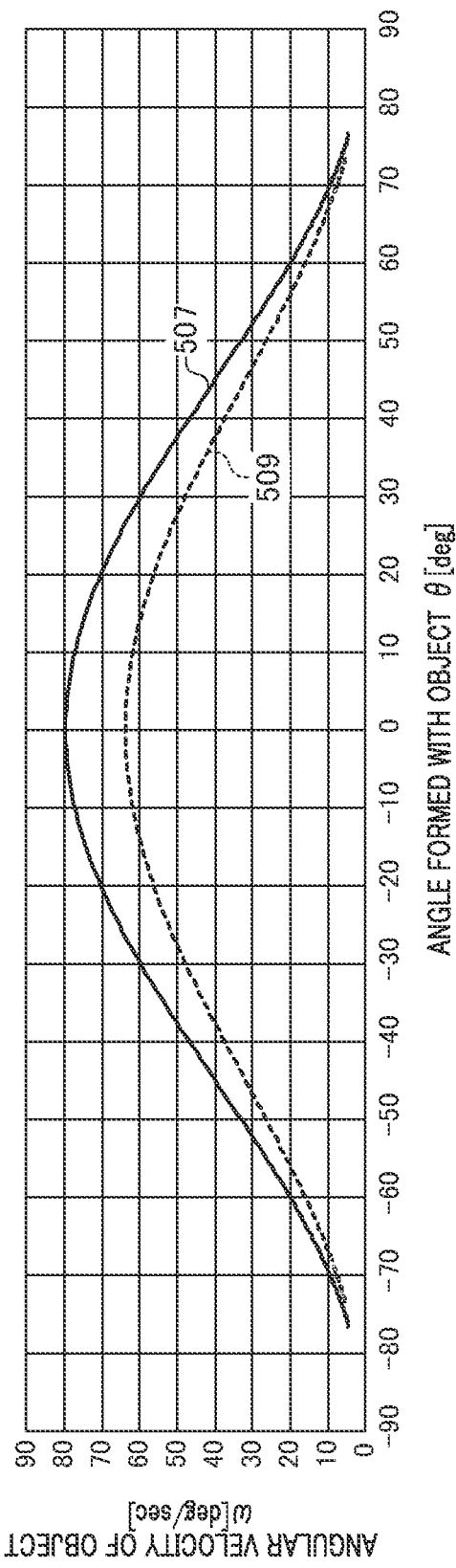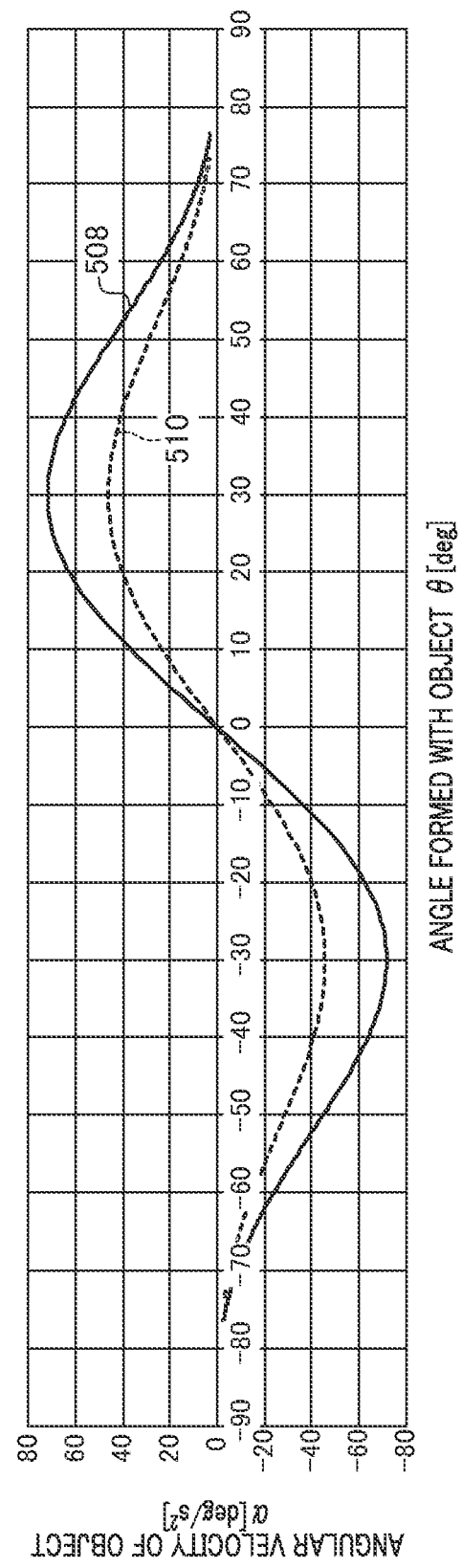

IMAGING DEVICE AND CONTROL METHOD THEREOF

BACKGROUND

Field of the Disclosure

The present disclosure relates to an imaging device and a control method thereof.

Description of the Related Art

One imaging method of a camera is panning in which an image having a lively feeling is captured by causing a background to flow while keeping an object still by capturing an image with a slow shutter while causing the camera to follow the moving object. Generally, panning is considered a difficult imaging technique. A first reason for this is that it is difficult to capture an image while following movement of an object with a camera. For example, when an object has a higher speed such as in motor sports, it is more difficult to make a camera follow movement of the object. A second reason is that it is difficult to set an optimum shutter speed for obtaining an image having a lively feeling by causing a background to flow while suppressing image blur (object blur) caused by a shake of the object.

If a shutter speed is set on too short a side due to a concern about object blur, the background will also stop and an image having a lively feeling cannot be obtained. On the other hand, if the shutter speed is set on too long a side to obtain an image having a lively feeling, an object shake is likely to occur. That is, since an amount of motion on an imaging surface changes due to different imaging scenes, it is not easy to make the camera follow movement of the object or set an optimum shutter speed for panning. Japanese Patent Laid-Open No. 2019-78843 discloses an imaging device that corrects object blur on the basis of an angular velocity of an object calculated on the basis of a relative difference between the object in the vicinity of an in-focus position of an imaging optical system and an imaging device.

During panning, since a camera moves with an angular velocity and the object is not always moving in parallel with the camera, an amount of shake is not the same at all positions of the object imaged on the imaging surface. That is, even for the same object, an amount of shake on the imaging surface differs at different positions of the object. As the shutter speed becomes longer, a difference in the amount of shake even in the same object appears more significantly, and therefore it is important to accurately detect and correct a core of panning. The core of panning is a region for which a photographer wants to correct object blur, that is, a reference region which serves as a reference for correcting the object blur. An imaging device disclosed in Japanese Patent Laid-Open No. 2019-78843 detects a shake of an object in the vicinity of an in-focus position. Therefore, under a setting condition in which, for example, a camera automatically determines an in-focus position on the basis of object detection, if a core of panning intended by a photographer and the in-focus position are different, there is a likelihood of failure of an example of panning.

SUMMARY

The present disclosure makes it possible to accurately detect a reference region that serves as a reference for correcting object blur during panning.

An imaging device of one embodiment of the present disclosure includes one or more processors configured to execute instructions which, when executed by the one or more processors, cause the imaging device to detect a motion between different images as a motion vector, determine a feature region of an object according to information on a moving direction of the object with respect to the imaging device, and determine a reference region for correcting image blur related to the object on the basis of a motion vector of the object related to the feature region.

Further features of the present disclosure will become apparent from the following description of exemplary embodiments with reference to the attached drawings.

BRIEF DESCRIPTION OF THE DRAWINGS

FIGS. 7A and 7B are diagrams showing an example of a relationship between the angle $\theta$ and an angular velocity $\omega$ or an angular acceleration a.

DESCRIPTION OF THE EMBODIMENTS

Figure 1:
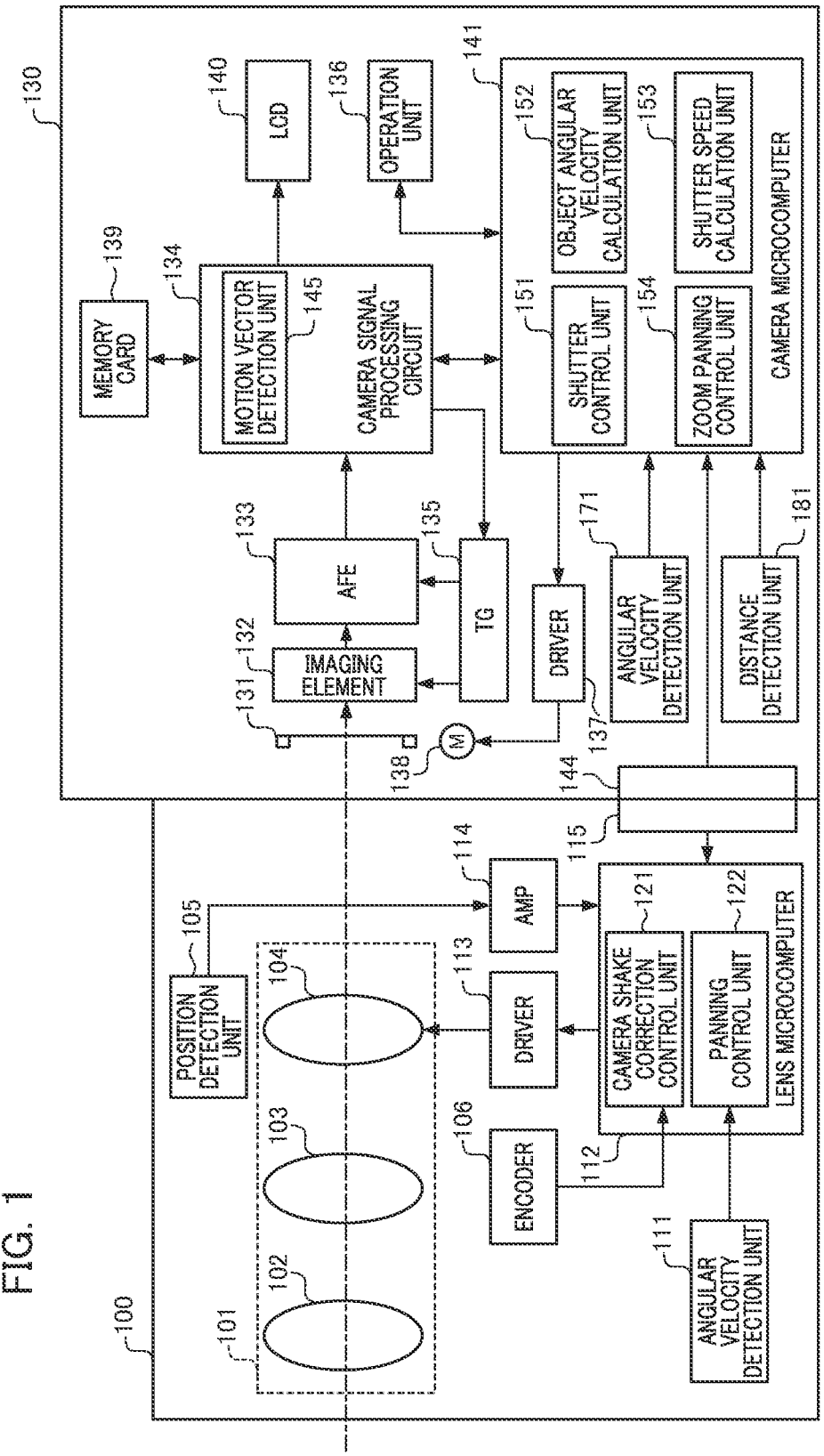
FIG. 1 is a diagram showing a configuration example of an imaging device.

FIG. 1 is a diagram showing a configuration example of an imaging device of the present embodiment. The imaging device includes an interchangeable lens 100 and a camera main body 130. The interchangeable lens 100 is detachably attached to the camera main body 130. Further, an applicable scope of the present disclosure is not limited to a camera of an interchangeable lens type. The present disclosure is also applicable to a lens-integrated camera in which a camera main body and a lens device (interchangeable lens) are integrally configured. Also, the present disclosure can be applied to electronic devices of various types having an image blur correction function. Hereinafter, a function of assisting a user with panning is referred to as "panning assist," and an image capturing mode in which control of the panning assist (panning assist control) is performed is referred to as "panning assist mode." Also, the present disclosure can be applied to an arbitrary moving body as an object. For example, the object is at least any moving body of a car, a ship, or an aircraft.

The interchangeable lens 100 includes an imaging lens unit 101, a position detection unit 105, an encoder 106, an angular velocity detection unit 111, a lens microcomputer 112, a driver 113, an amplifier circuit (AMP) 114, and a mount contact part 115.

The imaging lens unit 101 guides object light to an imaging element 132 in the camera main body 130. The imaging lens unit 101 includes a main imaging optical system 102, a zoom lens group (hereinafter referred to as "zoom lens") 103 whose focal length can be changed, and a shift lens group (hereinafter referred to as "shift lens") 104. The shift lens 104 is driven by the driver 113 under control of the lens microcomputer 112 and moves in a direction perpendicular to an optical axis to correct blur (image blur) of a captured image caused by a shake of the imaging device. "Lens microcomputer" is a name for a microcomputer for controlling a lens system.

The encoder 106 detects a position of the zoom lens 103. The position detection unit 105 detects a position of the shift lens 104. The position detection unit 105 is, for example, a Hall element. The angular velocity detection unit 111 detects a shake of the imaging device. The angular velocity detection unit 111 is, for example, a gyro sensor. The driver 113 is a voice coil type motor that drives the shift lens 104. The amplifier circuit (AMP) 114 amplifies an output of the position detection unit 105. The mount contact part 115 relays communication with the camera main body 130.

The lens microcomputer 112 controls the entire interchangeable lens 100. The lens microcomputer 112 includes, for example, a central processing unit (CPU), a memory, and the like. The lens microcomputer 112 includes a camera shake correction control unit 121 and a panning control unit 122. The panning control unit 122 performs the panning assist control. Specifically, if the panning assist mode is set, the panning control unit 122 corrects image blur (object blur) due to a shake of the object by driving the shift lens 104 on the basis of angular velocity information or the like obtained from a camera microcomputer 141. "Camera microcomputer" 141 is a name for a microcomputer for controlling a camera system. Further, in the present embodiment, the shift lens 104 is used as a blur correction member for correcting image blur, but an imaging element may be applied as a blur correction member and driven in place of the shift lens 104 or together with the shift lens 104.

During a normal mode in which a setting of the panning assist mode is not performed, the camera shake correction control unit 121 drives the shift lens 104 on the basis of a detection result of the angular velocity detection unit 111 to correct image blur caused by a shake of the imaging device. In addition to the above, the lens microcomputer 112 also performs focus lens control, aperture control, and the like, but description thereof will be omitted for the sake of simplification of illustration. Also, in image blur correction, detection and correction are performed for two perpendicular axes such as, for example, a vertical direction and a horizontal direction, but since the same configuration applies to the two axes, the image blur correction for only one axis will be described. From the above, the imaging device includes an image blur correction device that drives an optical element in a direction perpendicular to the optical axis to perform the image blur correction.

The camera main body 130 includes components from a shutter 131 to a distance detection unit 181. The shutter 131 controls an exposure time of the imaging element 132. The imaging element 132 is an image sensor using a CMOS element or the like. "CMOS" is an abbreviation for "complementary metal oxide semiconductor." The image element 132 photoelectrically converts object light that is image-formed through the imaging lens unit 101 and outputs an electric signal.

An analog signal processing circuit (AFE) 133 acquires and processes the output of the imaging element 132 and outputs it to the camera signal processing circuit 134. The camera signal processing circuit 134 processes the output of the analog signal processing circuit 133 to generate an image signal.

The camera signal processing circuit 134 includes a motion vector detection unit 145. The motion vector detection unit 145 detects a motion vector on the basis of a plurality of pieces of image data with different imaging times. That is, the motion vector detection unit 145 detects a motion between different frames (between images) as a motion vector.

A timing generator (TG) 135 sets operation timings of the image element 132 and the analog signal processing circuit 133. An operation unit 136 is used for an operation input by a photographer. The operation unit 136 has, for example, a power switch, a release switch, and the like. A shutter drive motor 138 drives the shutter 131. A driver 137 controls the shutter drive motor according to control of the camera microcomputer 141. A memory card 139 records image data (a video) obtained by imaging. The memory card 139 records image data (a video) obtained by imaging. A liquid crystal panel (LCD) 140 displays a captured image. A mount contact part 144 relays communication with the interchangeable lens 100. An angular velocity detection unit 171 detects a shake of the imaging device and outputs the detection result to the camera microcomputer 141 as angular velocity information. The distance detection unit 181 detects a distance to the object (object distance) and outputs the distance to the camera microcomputer 141.

The camera microcomputer 141 controls a system of the entire camera. The camera microcomputer 141 includes, for example, a CPU, a memory, and the like. In the example shown in FIG. 1, the camera microcomputer 141 includes a shutter control unit 151, an object angular velocity calculation unit 152, a shutter speed calculation unit 153, and a zoom panning control unit 154.

The shutter control unit 151 controls the driver 137. The shutter speed calculation unit 153 calculates a shutter speed suitable for panning. The object angular velocity calculation unit 152 calculates angular velocity information of the object used for correcting the object blur on the basis of the motion vector detected by the motion vector detection unit 145, a focal length, and the like, and transmits the calculated angular velocity information to the lens microcomputer 112. The zoom panning control unit 154 controls a zoom position so that the object imaged at an imaging angle of view for each frame is photographed in a constant size.

In FIG. 1, if power of the camera is turned on by the operation unit 136, the camera microcomputer 141 detects a state change thereof, and power supply to each circuit of the camera main body 130 and initial settings are performed by control of the camera microcomputer 141. Also, power supply to the interchangeable lens 100 is performed, and initial setting in the interchangeable lens 100 is performed by control of the lens microcomputer 112. Then, communication is started at a predetermined timing between control of the lens microcomputer 112 and of the camera microcomputer 141. For example, camera information including a state of the camera, an imaging setting, and the like is transmitted from the camera main body 130 to the interchangeable lens 100. The imaging setting includes, for example, a setting of the panning assist mode. Also, focal length information of the lens, angular velocity information, and the like are transmitted from the interchangeable lens 100 to the camera main body 130.

Figure 2:
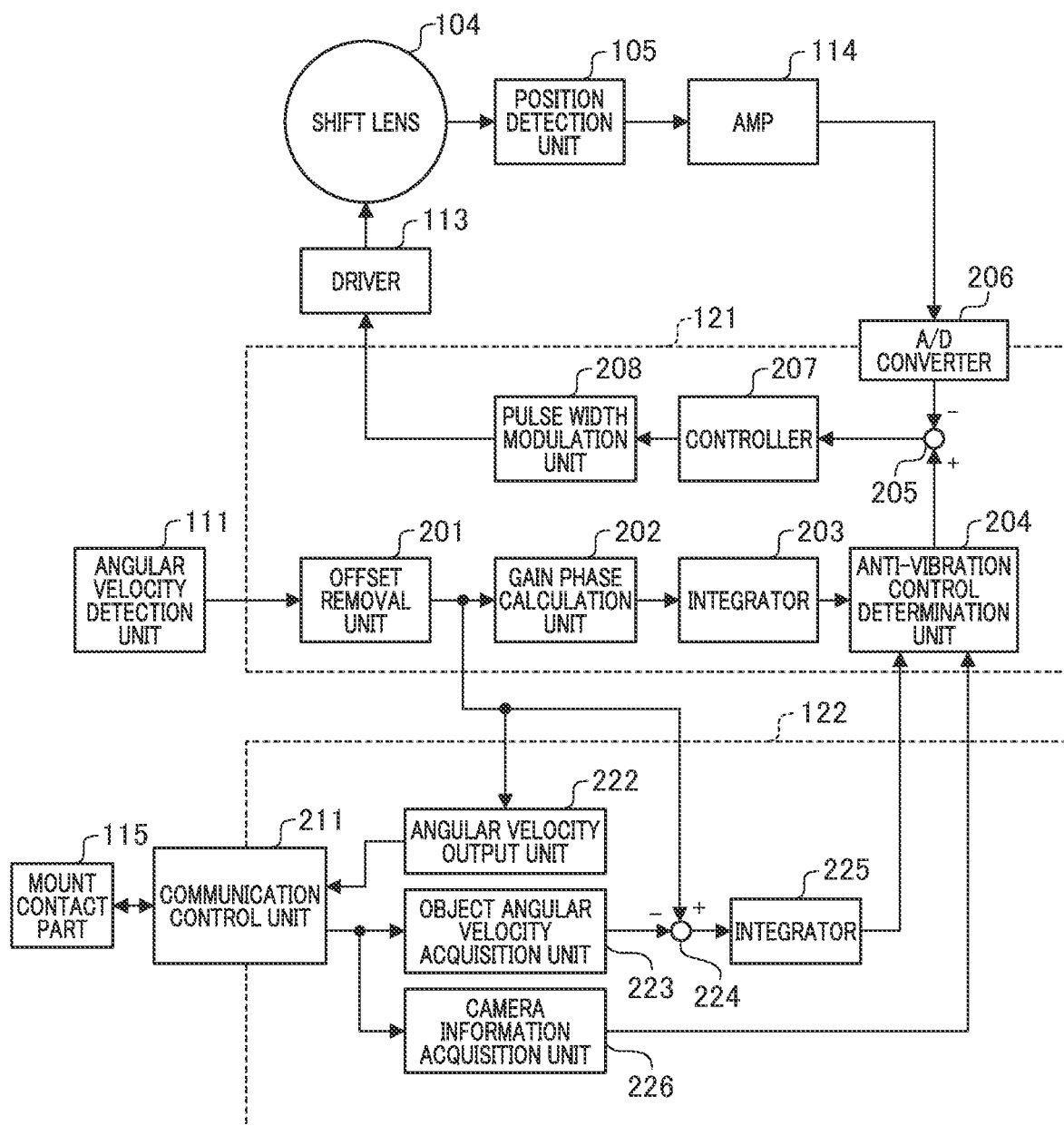
FIG. 2 is a diagram showing a configuration example of a camera shake correction control unit and a panning control unit.

FIG. 2 is a diagram showing a configuration example of a camera shake correction control unit and a panning control unit. Components which are the same as those in FIG. 1 are denoted by the same reference signs, and description thereof will be omitted. The camera shake correction control unit 121 includes units from an offset removal unit 201 to a pulse width modulation unit 208. The offset removal unit 201 performs removal of a DC component contained in an output of the angular velocity detection unit 111. The offset removal unit 201 is a filter calculation unit constituted by, for example, a high-pass filter (hereinafter, referred to as HPF) and the like.

A gain phase calculation unit 202 includes an amplifier that amplifies angular velocity information from which an offset component has been removed by the offset removal unit 201 with a predetermined gain, and a phase compensation filter. An integrator 203 has a function of changing characteristics of a frequency band in an arbitrary frequency band, integrates an output of the gain phase calculation unit 202, calculates a drive amount of the shift lens 104 used for camera shake correction control, and output the calculated drive amount to an anti-vibration control determination unit 204. If an angular velocity output by the angular velocity detection unit 111 has elapsed for a predetermined time with a size equal to or higher than a certain value, the integrator 203 determines that the camera is panning and gradually changes a cutoff frequency of the high-pass filter (HPF) of the offset removal unit 201 to a high frequency side. When the cutoff frequency is gradually changed to a high frequency side, a target signal of the camera shake correction control gradually becomes smaller, and the blur correction member returns to an optical center position. This is because, if the cutoff frequency is corrected without changing to a high frequency side on the basis of a large angular velocity to such an extent as to determine that the camera is panning, the blur correction member will reach a correction limit point, and a change in angle of view that is unnatural for the photographer will occur.

The anti-vibration control determination unit 204 switches a control signal for driving the shift lens 104 according to an output of a camera information acquisition unit 226. For example, if the output of the camera information acquisition unit 226 indicates that the panning assist mode is set, the anti-vibration control determination unit 204 adopts an output of an integrator 225 calculated by the panning control unit 122. If the output of the camera information acquisition unit 226 indicates that an image capturing mode other than the panning assist mode is set, the anti-vibration control determination unit 204 adopts an output of the integrator 203 in the camera shake correction control unit 121.

An A/D converter 206 digitizes and outputs an output of the AMP 114. A subtractor 205 subtracts an output of the A/D converter 206 from an output of the anti-vibration control determination unit 204, and outputs deviation data thereof to the controller 207. The controller 207 includes an amplifier that amplifies the deviation data output by the subtractor 205 with a predetermined gain, and a phase compensation filter. The deviation data is output to the pulse width modulation unit 208 after signal processing by the amplifier and the phase compensation filter is performed in the controller 207. The pulse width modulation unit 208 modulates the output of the controller 207 into a waveform (PWM waveform) that changes a duty ratio of a pulse wave, and outputs it to the driver 113 for driving the shift lens. When the driver 113 drives the shift lens 104, the image blur is corrected.

The panning control unit 122 includes units from a communication control unit 211 to the camera information acquisition unit 226.

The communication control unit 211 communicates with the camera microcomputer 141 via the mount contact parts 115 and 144. For example, the communication control unit 211 receives an angular velocity and an angular acceleration of the object from the camera microcomputer 141 and outputs the angular velocity and the angular acceleration to an object angular velocity acquisition unit 223. Also, for example, the communication control unit 211 receives camera information from the camera microcomputer 141 and outputs the camera information to the camera information acquisition unit 226. The object angular velocity acquisition unit 223 calculates an angular velocity of the object during an exposure period on the basis of the angular velocity and the angular acceleration of the object received from the communication control unit 211, and outputs the calculated angular velocity to an adder 224. Also, the camera information acquisition unit 226 acquires camera information output by the communication control unit 211 and outputs the camera information to the anti-vibration control determination unit 204. An angular velocity output unit 222 acquires angular velocity information from the offset removal unit 201 and outputs the angular velocity information to the communication control unit 211. The communication control unit 211 transmits the angular velocity information received from the angular velocity output unit 222 to the camera microcomputer 141.

The adder 224 performs subtraction with an output of the offset removal unit 201 as a positive input and an output of the object angular velocity acquisition unit 223 as a negative input. A subtraction result is output to the integrator 225. The integrator 225 integrates the output of the adder 224 to calculate a drive amount of the shift lens 104 used for the panning assist control and outputs the calculated drive amount to the anti-vibration control determination unit 204. If the panning assist is set, the anti-vibration control determination unit 204 adopts a signal of the drive amount output by the integrator 225 and outputs it to the subtractor 205. Thereby, the shift lens 104 is driven on the basis of the drive amount calculated by the panning control unit 122, and the object blur is corrected.

Figure 3:
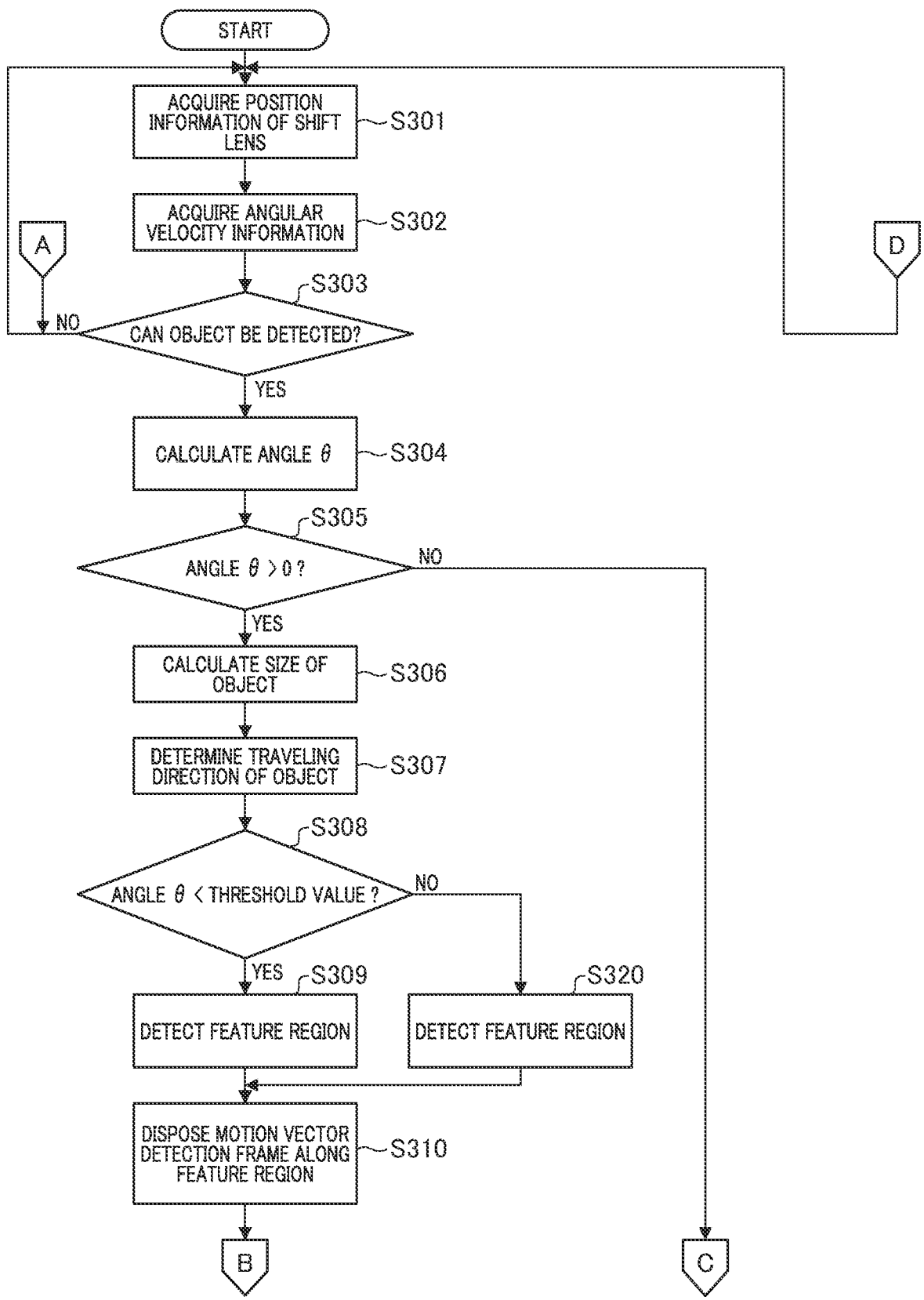
FIG. 3 is a flowchart for explaining an example of object blur correction processing.
Figure 4:
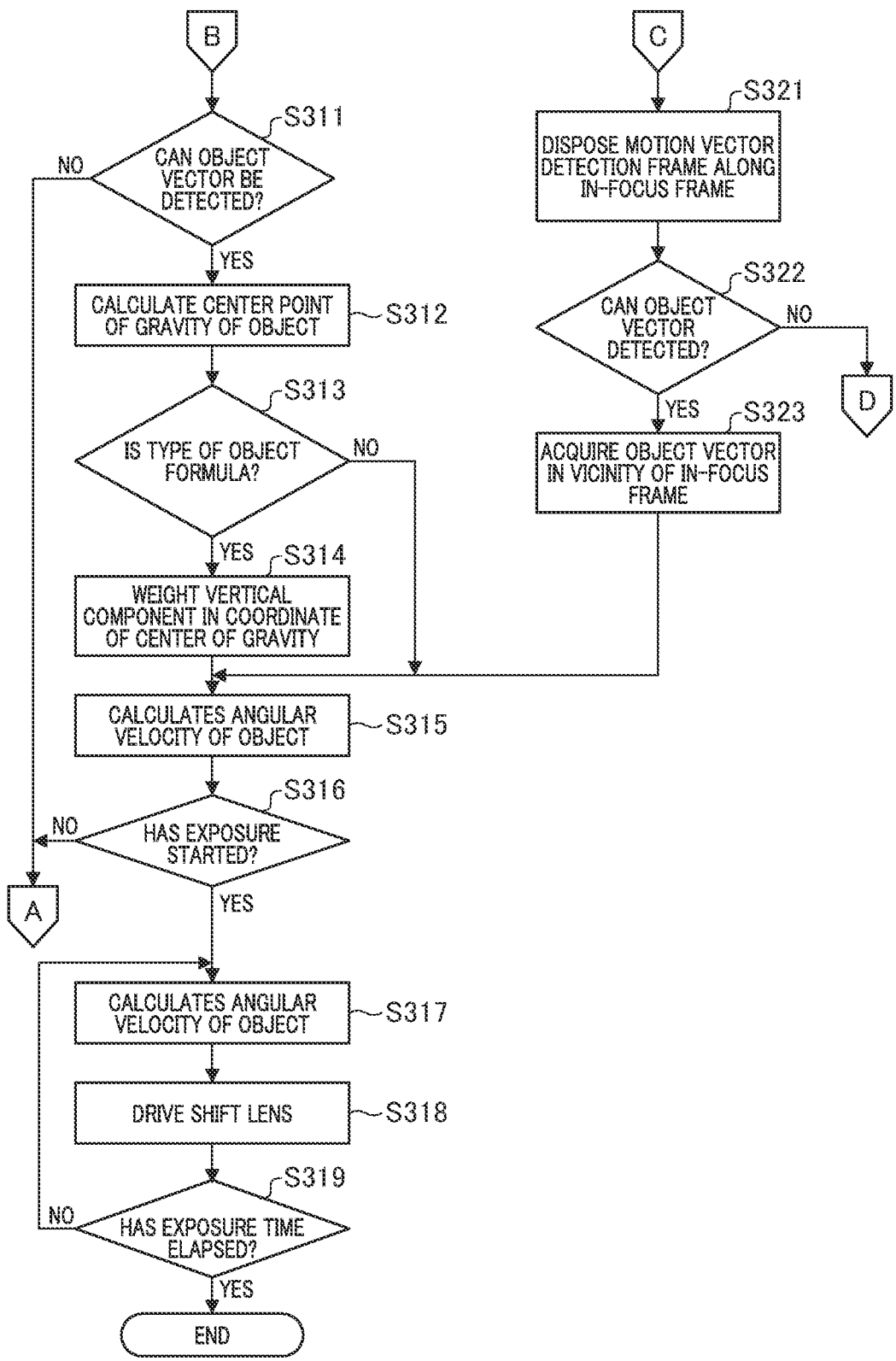
FIG. 4 is a flowchart for explaining an example of object blur correction processing.

FIGS. 3 and 4 are flowcharts explaining an example of object blur correction processing by the panning assist control. Processing of the present flowchart is mainly realized by a function of the camera microcomputer 141, the camera signal processing circuit 134, or the lens microcomputer 112.

In S301, the camera microcomputer 141 acquires position information of the shift lens 104 in the interchangeable lens 100 from the lens microcomputer 112. This is because, as shown in expression (1), a vector value δv detected by the motion vector detection unit 145 originally must be a value in which a value obtained by converting a drive amount of the shift lens 104 into an amount of displacement δo on an imaging surface is added to a value obtained by converting an angular velocity of the camera into an amount of displacement δg on the imaging surface. Further, if the imaging element is used as a shake correction member, an amount of displacement of the imaging element may be added to a third term on the right-hand side of expression (1).

$$\delta_v = \delta_g + \delta_o \qquad \text{Expression (1)}$$

Next, in S302, the camera microcomputer 141 acquires angular velocity information detected by the angular velocity detection unit 111 in the interchangeable lens 100 and the angular velocity detection unit 171 in the camera main body 130. Then, the camera microcomputer 141 converts the acquired angular velocity [deg/sec] into a movement amount [pixel/frame] on the imaging surface by using a focal length [mm], a frame rate [frame/sec], and a pixel pitch [um/pixel]. This is because motion vector information detected by the motion vector detection unit 145 is utilized for extracting a motion vector related to the object.

Next, in S303, the camera microcomputer 141 determines whether or not the object can be detected on the basis of image data related to a captured image. If the object cannot be detected, the processing returns to S301. If the object can be detected, the processing proceeds to S304. As a method of detecting the object, a method of detecting an object type such as a person, an animal, or a vehicle, and an organ such as a head part or pupils of a person on the basis of learnt data, and outputting the object information including a detection position can be applied.

In S304, the camera microcomputer 141 calculates (acquires) an angle θ formed by the object and the imaging device. The angle θ indicates an angle at which the object is imaged with respect to the imaging element. According to a size of the angle θ, it is possible to switch and control a region to be used as a core of panning. The core of panning is a region (reference region) serving as a reference for correcting image blur related to the object in the panning assist control.

Figure 6:
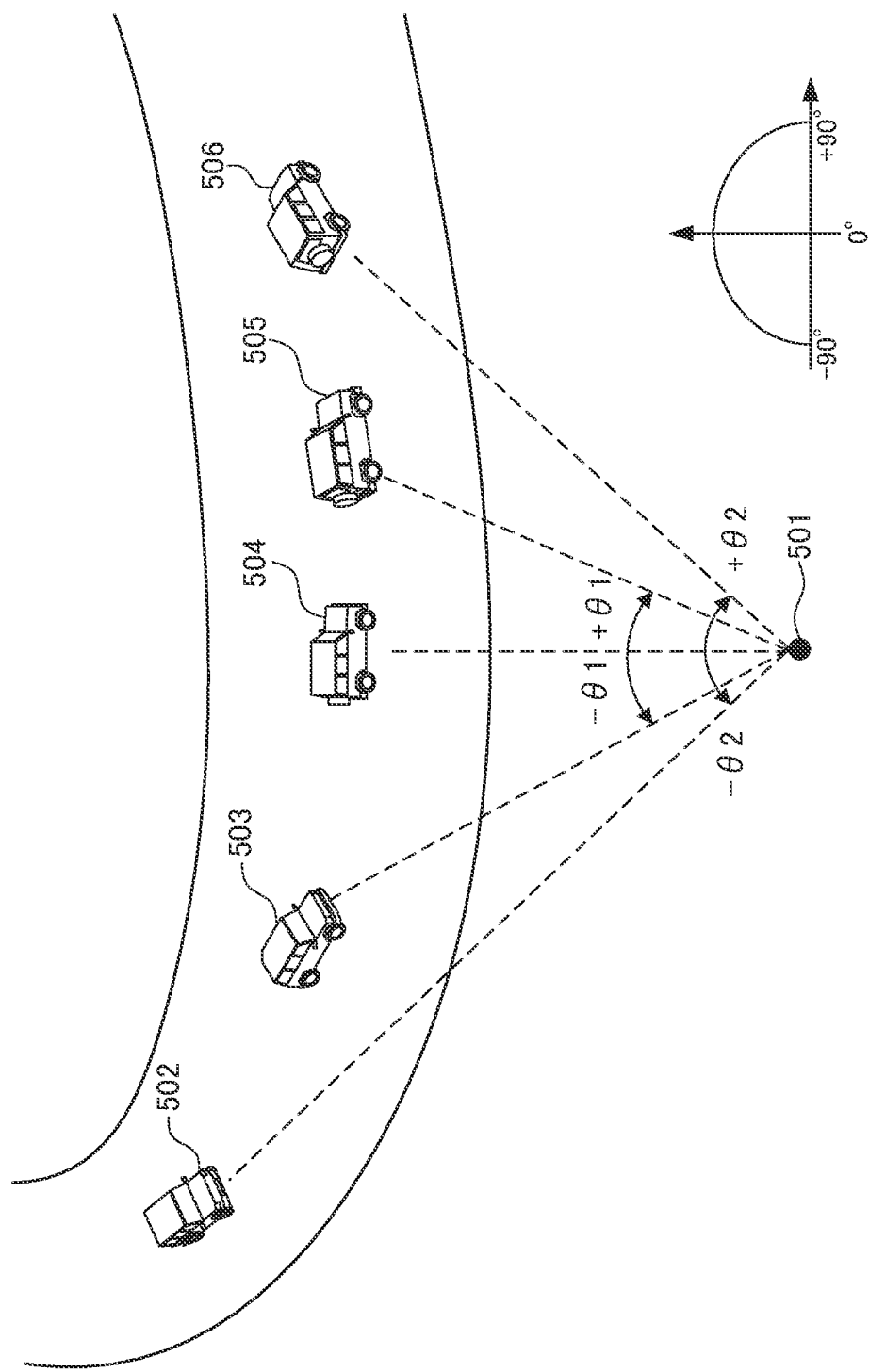
FIG. 6 is a view for explaining an angle $\theta$ formed by an object and the imaging device.

FIG. 6 is a view for explaining an angle θ formed by an object and an imaging device. FIG. 6 illustrates a state in which an object viewed from a photographer 501 is positioned at each of an object position 502 to an object position 506. Imaging starts from the object position 502, passes through the object position 504 in front of the photographer 501, and finally to the object position 506 in order. Further, in the figure illustrated in FIG. 6, the photographer 501 is in a state of holding the imaging device, and it is assumed that a front direction of the photographer 501 and a front direction of the imaging device are the same direction. Also, in FIG. 6, an object position in which a movement trajectory of the object and an optical axis direction of the imaging device are substantially perpendicular to each other, and an object distance L is the shortest is defined as the front of the photographer 501 (the front of the imaging device). Therefore, for example, even if the imaging device is directed in a direction of the object when the object is present at the object position 502, the object position 502 is not regarded as the front of the photographer 501. The angle θ corresponds to a direction of the moving object with respect to the front direction of the photographer. The angle θ in a counterclockwise direction is defined as that with a negative sign and the angle θ in a clockwise direction is defined as that with a positive sign with the object position 504 in front of the photographer as a reference point. The angle θ can be expressed by expression (2) using the object distance L [m], an object velocity V [m/s], and an object movement time t [s] between two points.

$$\theta = \tan^{-1}\left(\frac{Vt}{L}\right) \quad \text{Expression (2)}$$

When the angle θ expressed by expression (2) is differentiated once with respect to a time component, an angular velocity ω of the object is obtained. The angular velocity ω can be expressed by expression (3).

$$\omega = \frac{LV}{L^2 + (Vt)^2} \quad \text{Expression (3)}$$

When the angular velocity ω expressed by expression (3) is differentiated once with respect to a time component, an angular acceleration a of the object is obtained. The angular acceleration a can be expressed by expression (4).

$$\alpha = -\frac{2LV^3 t}{\{L^2 + (Vt)^2\}^2} \quad \text{Expression (4)}$$

FIGS. 7A and 7B are diagrams showing an example of a relationship between the angle θ and the angular velocity ω or the angular acceleration a. FIG. 7A shows a relationship between the angle θ at each object position illustrated in FIG. 6 and the angular velocity ω of the object. As shown by a solid line 507, the angular velocity ω rises greatly as the object approaches the photographer such as at the object positions 502 and 503, and reaches a maximum angular velocity at the object position 504 in front of the photographer. The angle θ at this time is 0°. The angular velocity ω decreases as the object passes the front of the photographer and reaches the object positions 505 and 506. Further, when the object velocity V is slow, the movement time of the object (object movement time) t between two points is short, and the object distance L is large, the relationship between the angle θ and the angular velocity ω changes from the solid line 507 to a broken line 509.

FIG. 7B shows a relationship between the angle θ at each object position illustrated in FIG. 6 and the angular acceleration a of the object. As shown by a solid line 508, the angular acceleration a becomes a negative maximum angular velocity at the angle θ of −30° as the object approaches the photographer such as at the object positions 502 and 503. The angular acceleration a is 0 at the object position 504 in which the object is in front of the photographer. As the object passes the front of the photographer and reaches the object positions 505 and 506, the angle θ becomes a positive maximum angular acceleration at the angle θ of +30°. Thereafter, the angular acceleration a decreases toward 0. Further, when the object velocity V is slow, the object movement time t between two points is short, and the object distance L is large, the relationship between the angle θ and the object angular velocity ω changes from the solid line 508 to a broken line 510.

Another calculation method of the angle θ will be described. For example, if the object velocity V cannot be detected directly in the camera, the camera microcomputer 141 acquires the angle θ according to expression (5) on the basis of an object motion vector δ (object vector) detected as an amount of motion on the imaging surface and a focal length f. Also, the camera microcomputer 141 can calculate the angular velocity ω using expression (6) on the basis of a frame rate p which is a detection cycle of the motion vector. The angular acceleration a can be expressed by expression (7) by taking a difference from the angular velocity ω one frame before.

$$\theta = \tan^{-1}\left(\frac{\sigma}{f}\right) \quad \text{Expression (5)}$$

$$\omega = p\theta = p\tan^{-1}\left(\frac{\sigma}{f}\right) \quad \text{Expression (6)}$$

$$\alpha = \omega_N - \omega_{N-1} \quad \text{Expression (7)}$$

The description returns to FIG. 3. By processing of S305 to S309 or S320 described below, a feature region of the object is determined according to a size of the angle θ. The feature region is a region that serves as a base (reference) for determining a core of panning. If an analysis result of the angle θ (for example, a size and sign of the angle θ) indicates that the object has passed the front of the photographer (the front of the imaging device), the camera microcomputer 141 determines a feature region.

First, in S305, the camera microcomputer 141 determines whether the angle θ is larger than 0 (whether it is a positive sign). The angle θ larger than 0 indicates that the object has passed the front of the photographer. Therefore, if the angle θ is larger than 0, the processing proceeds to S306. If the angle θ is not larger than 0, the processing proceeds to S321 in FIG. 4. Further, the angular acceleration a changes like the solid line 508 or the broken line 510 shown in FIG. 7B according to the position of the object. Therefore, the camera microcomputer 141 may determine whether or not the object has passed the front of the photographer on the basis of a size and sign of the angular acceleration a instead of a size and sign of the angle θ. For example, if the angular acceleration a is greater than 0, it is determined that the object has passed the front of the photographer.

Figure 8A:
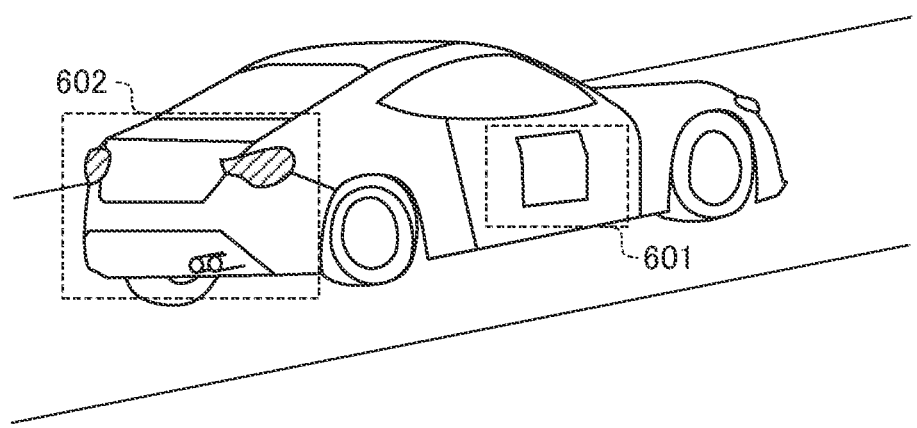
FIGS. 8A and 8B are views for explaining an example of a core of panning depending on composition.
Figure 8B:
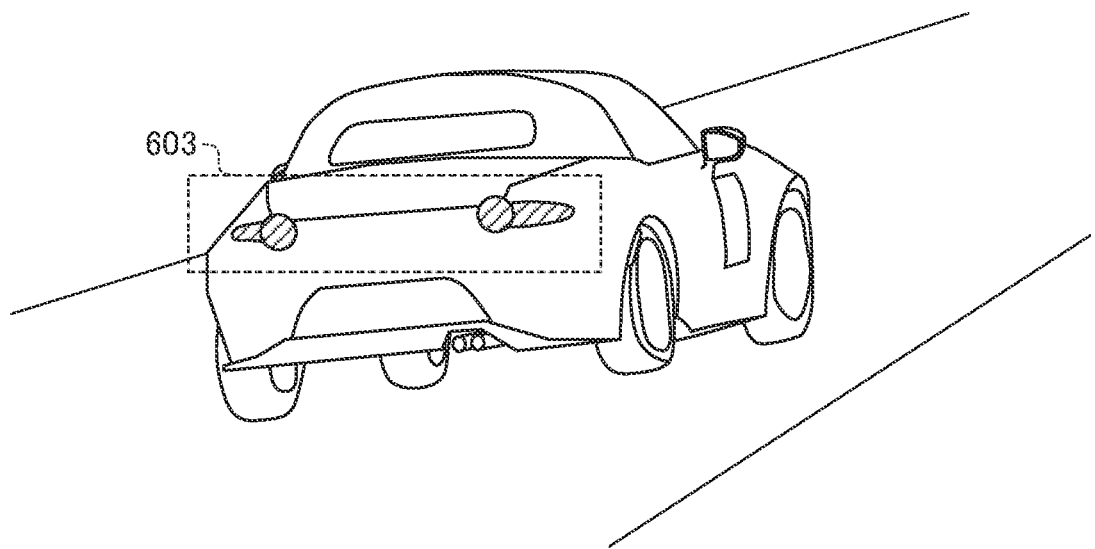

FIGS. 8A and 8B are views for explaining an example of a core of panning depending on composition. The imaged scenes corresponding to FIGS. 8A and 8B illustrate motor sports, and it is assumed that types of the object are automobiles of a vehicle, specifically, a touring car. FIG. 8A illustrates composition at the object position 505 in which the object has passed the front of the photographer. FIG. 8B illustrates composition at the object position 506 in which the object has passed the front of the photographer.

In the composition illustrated in FIG. 8A, candidates to be a core of panning are two regions including, for example, a side surface 601 of a vehicle body and a tail lamp 602 of the vehicle body. If the photographer wants to use a logo, a number, an emblem, or the like on the side surface of the car body as the core of the panning, it is desirable that a region corresponding to the side surface 601 of the car body be preferentially determined as the core of the panning. Also, if the photographer wants to image an example in which a light trail of the tail lamp is caused to flow by, for example, setting a shutter speed as long as possible, it is desirable that a region corresponding to the tail lamp 602 be preferentially determined as the core of the panning. Also, in the composition illustrated in FIG. 8B, the angle θ formed by the object and the imaging device is larger than the angle θ at the object position 505, and the tail lamp 603 faces the front of the photographer. Therefore, in the composition illustrated in FIG. 8B, the camera microcomputer 141 controls so that a region corresponding to the tail lamp 603 is preferentially determined as the core of the panning.

The description returns to FIG. 3. In S306, the camera microcomputer 141 calculates a size of the object (size of the region of the object) imaged on the imaging surface. The camera microcomputer 141 detects types and a part (region) of the object on the basis of learnt data by, for example, an object detection function. Then, the size of the object is obtained on the basis of a detection result (size of the detection region) as information on the size of the region of the object and a pixel size (effective pixel size of the imaging element) of a unit configured for imaging. Also, if the imaging device includes an imaging element having an imaging plane phase difference AF function, the camera microcomputer 141 may obtain the size of the object as follows. The camera microcomputer 141 determines that an in-focus frame within a threshold value (for example, ±2 depth) with a depth of field in a region at the in-focus frame position, that is, a focus detection region as a reference is the object. Then, the size of the object may be obtained from the size of the in-focus frame determined to be the object as information on the size of the region of the object and the effective pixel size of the imaging element. Further, in S306, it is configured such that the size of the object imaged on the imaging surface, that is, the size of the object in the image is calculated, but the size of the object in a real space may be calculated by using a sensor such as a LiDAR sensor that can measure an object distance in the real space.

Next, in S307, the camera microcomputer 141 determines a moving direction of the object imaged on the imaging surface. During panning, the photographer swings the camera to follow the object. Therefore, the camera microcomputer 141 may determine the moving direction of the object on the basis of sizes and signs of the angular velocity information output by the angular velocity detection unit 171 in the camera main body 130 and the angular velocity information output by the angular velocity detection unit 111 in the interchangeable lens 100. Also, the camera microcomputer 141 may determine the moving direction of the object on the basis of a size and sine of the motion vector detected by the motion vector detection unit 145. As described above, in S307, the moving direction of the object imaged on the imaging surface, that is, the moving direction of the object in the image may be determined using the angular velocity information or the motion vector information as the information on the moving direction of the object. However, the moving direction of the object in a real space may be calculated by using a sensor such as a LiDAR sensor that can measure an object distance in the real space.

Next, in S308, the camera microcomputer 141 determines whether the angle θ is less than a threshold value. The threshold value is, for example, an empirical value or an experimental value, and is determined in advance. For example, +30° is used as the threshold value. If the angle θ is less than the threshold value, the processing proceeds to S309. Composition when the angle θ is less than the threshold value is, for example, the composition illustrated in FIG. 8A. If the angle θ is equal to or larger than the threshold value, the processing proceeds to S320. Composition when the angle θ is equal to or larger than the threshold value is, for example, the composition illustrated in FIG. 8B.

In S309, the camera microcomputer 141 functions as a first unit configured to perform determination and detects (determines) a feature region of the object on the basis of information on a size of the region corresponding to the object (for example, a size of the object region) and information on a moving direction of the object. As described above, in the composition illustrated in FIG. 8A, there may be a plurality of candidates that are desired to be a core of the panning. Therefore, the camera microcomputer 141 determines the feature region so that a region selected by a user operation such as, for example, an input of line-of-sight, a button operation, and a touch operation preferentially becomes a region corresponding to the core of the panning. Also, the feature region may be determined so that information on a portion of the object that is desired to be the core of panning is stored in advance in a unit configured for storage in the imaging device as registration information of the core of the panning, and a region selected on the basis of the registration information preferentially becomes a region corresponding to the core of the panning. Also the camera microcomputer 141 may display the determined feature regions on a liquid crystal panel or the like to be selectable, and use a selected one from the displayed feature regions as the feature region used for determining the core of the panning.

Figure 9:
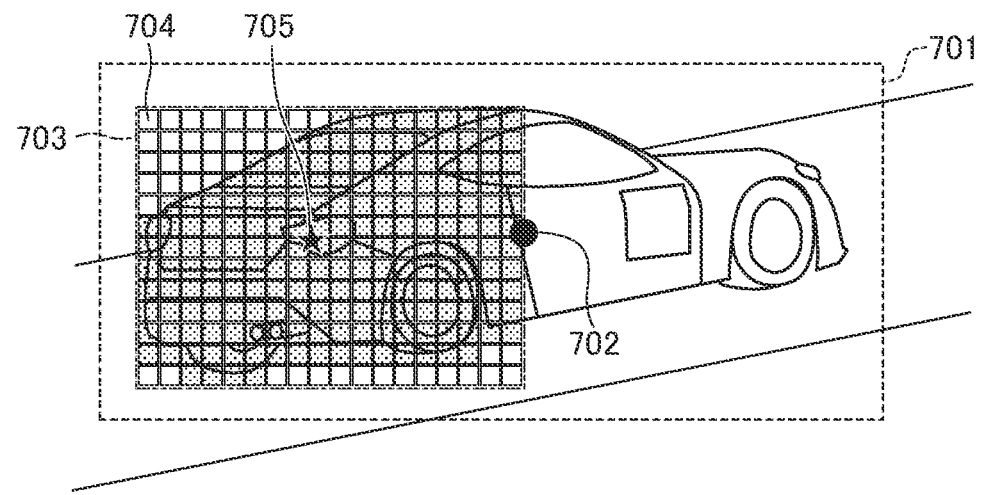
FIG. 9 is a view for explaining a detection example of a feature region.

FIG. 9 is a view for explaining a detection example of a feature region. In FIG. 9, a case in which the tail lamp 602 is selected as a preferred region as the core of panning in FIG. 8A is assumed. Further, as will be described later, the core of panning is determined to be a region in the vicinity of a center point of gravity of the object calculated on the basis of the object vector relating to the feature region. Therefore, the core of the panning finally determined may not have to be the same as the tail lamp 602.

First, as described above in the description of S306 in FIG. 3, the camera microcomputer 141 detects an object region 701 on the imaging surface by using the object detection function or a depth of field of an imaging surface phase difference AF. Next, the camera microcomputer 141 calculates a center point 702 of the object region 701 on the basis of a horizontal size and a vertical size of the object region 701. In the composition of FIG. 8A, a horizontal position of the tail lamp 602 is a position in a direction opposite to the moving direction of the object. Therefore, the camera microcomputer 141 determines a region at a position in a direction opposite to the moving direction (horizontal right direction in FIG. 9) of the object obtained in S307 from the center point 702 as a feature region 703.

The description returns to FIG. 3. In S320 of FIG. 3, the camera microcomputer 141 detects the feature region of the object. A method for detecting the feature region is the same as the method described with reference to FIG. 9. In processing of S320, the composition illustrated in FIG. 8B is assumed. Therefore, in the processing of S320, the feature region is determined so that the region corresponding to the tail lamp 603 is determined as the core of the panning.

Next, in S310, the camera microcomputer 141 disposes a motion vector detection frame 704 along the feature region detected in S309 (for example, the feature region 703 in FIG. 9). Next, due to the processing of S311 to S315 in FIG. 4 to be described later, the core of panning is determined on the basis of the object vector related to the feature region, and the angular velocity of the object is calculated on the basis of the motion vector of the core of the panning.

First, in S311 of FIG. 4, the camera microcomputer 141 executes object vector detection processing on the basis of the motion vector detected from the region of the motion vector detection frame 704 disposed in S310. Then, the camera microcomputer 141 determines whether or not the object vector can be detected. If the object vector can be detected, the processing proceeds to S312. If the object vector cannot be detected, the processing returns to S301 and processing related to a next frame is performed.

Figure 5:
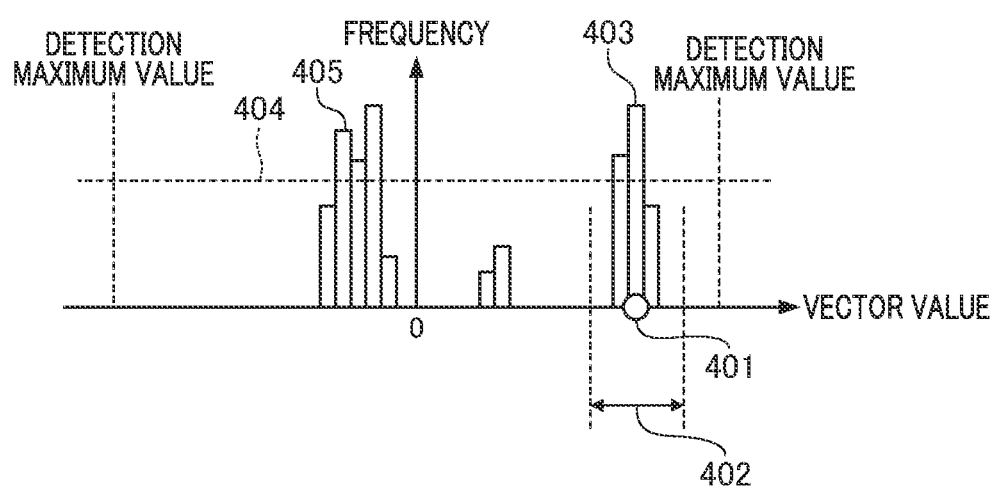
FIG. 5 is a diagram for explaining an example of object vector detection processing.

FIG. 5 is a diagram for explaining an example of object vector detection processing.

The object vector can be detected using the histogram shown in FIG. 5. The motion vector detection unit 145 detects an amount of motion from one frame before as a motion vector in each block disposed at predetermined positions. The motion vector detection unit 145 cannot determine whether the motion vector of each block is an object vector or a background vector. Therefore, the camera microcomputer 141 determines that a motion vector present in a background range 402 is a background vector group 403 with angular velocity information 401 obtained by the conversion processing to a movement amount δg on the imaging surface in S302 of FIG. 3 as a starting point. Also, the camera microcomputer 141 determines that a vector which is a motion vector present outside the background range 402 and whose frequency exceeds a predetermined threshold value 404 is an object vector group 405. Further, a length of the background range 402 may be variable depending on a focal length or a detection accuracy of the motion vector detection unit 145.

Also, the detection of the object vector can also be performed on the basis of the depth of field of the imaging surface phase difference AF instead of the angular velocity information. For example, with the depth of field of the in-focus frame position as a starting point the camera microcomputer 141 determines that a motion vector present in a region of a depth difference in a predetermined range is the object vector group, and determines that a motion vector present outside the region of the depth difference in the predetermined range is the background vector group. Also, the camera microcomputer 141 may determine the object vector group and the background vector group by using the depth of field information and the angular velocity information together.

The description returns to FIG. 4. In S312, the camera microcomputer 141 calculates (determines) the center point of gravity of the object on the basis of the object vector detected in S311. The camera microcomputer calculates a center point of gravity 705 of a horizontal component and a vertical component of the object vector detected from, for example, the motion vector corresponding to the motion vector detection frame 704 of the feature region 703 of FIG. 9 as a center point of gravity of the object by expression (8). The object vector is, for example, a vector corresponding to a transparently filled region in FIG. 9, and N is the number of detection frames in the region. $x_G$ and $y_G$ indicate the horizontal component and the vertical component of the center point of gravity 705.

$$x_G = \frac{\sum_{i=0}^{N} x_i}{N}, y_G = \frac{\sum_{i=0}^{N} y_i}{N} \qquad \text{Expression (8)}$$

Further, if the size of the object is not within a predetermined range, for example, the camera microcomputer 141 does not calculate the center point of gravity of the object. If the center point of gravity of the object is not calculated, the imaging device may drive the shift lens 104 on the basis of the angular velocity information of the object calculated from the object vector detected from the motion vector detection frame disposed along the in-focus frame. Alternatively, of the regions of the object corresponding to the object vectors, the imaging device may use a region selected by a user operation or on the basis of information on a portion of the object registered as the core of panning in advance as the core of the panning.

The description returns to FIG. 4. In S313, the camera microcomputer 141 determines whether a type of the object is a first type. In this example, the camera microcomputer 141 determines whether the type of the object is a formula car. If the type of the object is a formula car, the processing proceeds to S314. If the type of the object is not a formula car but a second type (for example, a touring car), the processing proceeds to S315.

Processing of S314 will be described. Generally, a position of a tail lamp of a formula car is on a lower side of a vehicle body. Therefore, in S314, the camera microcomputer 141 weights a vertical component of the center point of gravity of the object calculated in S312 and moves the center point of gravity before the weighting to a lower side (downward) in the vertical direction. The camera microcomputer 141 obtains an average value of differences between vertical components, for example, at the center point of gravity and a lower end of the feature region. Then, the camera microcomputer 141 moves the center point of gravity downward by subtracting the obtained average value from the vertical component of the center point of gravity. Further, a method of the weighting is not limited to the above-described method.

Next, in S315 to S318, the camera microcomputer 141 and the lens microcomputer 112 function as a control unit configured to correct the object blur by driving the shift lens 104 on the basis of the angular velocity information of the object determined on the basis of the motion vector of the core of panning.

First, in S315, the camera microcomputer 141 calculates the angular velocity of the object. For example, if the type of the object is a formula car and the center point of gravity is weighted in S314, the angular velocity of the object is calculated as follows. The camera microcomputer 141 calculates the angular velocity of the object on the basis of the motion vector detected by the motion vector detection frame disposed in the vicinity of the center point of gravity moved downward in the vertical direction due to weighting. That is, the camera microcomputer 141 functions as a second unit configured to perform determination that determines a region in the vicinity of a point obtained by weighting the center point of gravity as the core of panning, and calculates the angular velocity of the object on the basis of the motion vector of the core of the panning. Specifically, the camera microcomputer 141 converts the vector value related to the motion vector from a pixel unit to an angular velocity unit using a focal length, a frame rate, and a pixel pitch, and calculates it as the angular velocity of the object. Also, the camera microcomputer 141 calculates the angular acceleration of the object as a difference of the angular velocity of the object so that the acceleration/deceleration of the object can also be taken into account and corrected.

If the type of the object is a touring car (NO in S313), the camera microcomputer 141 determines a region in the vicinity of the center point of gravity calculated in S312 as the core of panning. In the example illustrated in FIG. 9 described above, a region in the vicinity of the center point of gravity 705 is used as the core of the panning. For example, the tail lamp 602 illustrated in FIG. 8A, or a predetermined region in the tail lamp 602 is used as the core of the panning. Then, the camera microcomputer 141 calculates the angular velocity of the object on the basis of the motion vector detected by the motion vector detection frame 704 disposed in the region of the core of the panning.

Next, in S316, the camera microcomputer 141 determines whether or not an instruction of exposure start has been given by the photographer pressing a release button. If there has been no instruction to start exposure, the processing returns to S301 in FIG. 3, and processing related to a next frame is performed. If there has been an instruction to start exposure, the processing proceeds to S317.

In S317, the camera microcomputer 141 transmits the angular velocity and the angular acceleration of the object calculated in S315 to the lens microcomputer 112 for each frame. The lens microcomputer 112 calculates the angular velocity of the object during the exposure period on the basis of the received angular velocity and angular acceleration of the object. This is to enable correction of the object blur in consideration of a release time lag from when the photographer presses the release button until the start of exposure.

Next, in S318, the lens microcomputer 112 drives the shift lens 104 on the basis of the angular velocity of the object calculated in S317. Thereby, the object blur is corrected. Next, in S319, the camera microcomputer 141 determines whether or not a predetermined exposure time has elapsed. If the exposure time has elapsed, the processing ends. Then, after the development is completed, control from a next frame is started. If the exposure time has not elapsed, the processing returns to S317. Thereby, the shift lens 104 continues to be driven until the exposure time has elapsed.

Next, processing in S321 will be described. The angle θ being not larger than 0 (No in S305 of FIG. 3) indicates composition in which the object has not passed the front of the photographer, that is, the object is approaching the photographer. In this composition, the front of the object is captured, and a detection accuracy of the object increases. Therefore, in S321, the camera microcomputer 141 uses the region (focus detection region) in the vicinity of the in-focus frame as the core of panning and disposes the motion vector detection frame along the in-focus frame.

Next, in S322, the camera microcomputer 141 detects an object vector using a histogram as in S311 from the motion vector obtained by the motion vector detection frame disposed in S321. The camera microcomputer 141 determines whether or not the object vector can be detected. If the object vector cannot be detected, the processing returns to S301 in FIG. 3, and processing related to a next frame is performed. If the object vector can be detected, the processing proceeds to S323.

In S323, the camera microcomputer 141 acquires the object vector detected in S322. Then, the processing proceeds to S315. In S315, the camera microcomputer 141 calculates the angular velocity and the angular acceleration of the object on the basis of the object vector acquired in S323. Then, due to the processing of S316 to S318 described above, the shift lens 104 is driven on the basis of the angular velocity information of the object determined on the basis of the object vector detected from the focus detection region.

The present disclosure is not limited to the embodiments described above. For example, it is assumed that the imaging device shown in FIG. 1 is a so-called mirrorless camera in which a reflex mirror is not present, but the present disclosure can also be applied to a single-lens reflex camera. In a single-lens reflex camera, during finder imaging, if a video signal obtained by a photometric sensor is input to the motion vector detection unit 145, the same control as in the mirrorless camera is possible.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-173040, filed Oct. 22, 2021, which is hereby incorporated by reference excipient in its entire.

What is claimed is:

1. An imaging device comprising:
one or more processors configured to execute instructions which, when executed by the one or more processors, cause the imaging device to:
detect a motion between different images as a motion vector;
determine a feature region of an object according to information on a moving direction of the object with respect to the imaging device; and
determine a reference region for correcting image blur related to the object on the basis of a motion vector of the object related to the feature region,
wherein the one or more processors calculate a center point of gravity of the object on the basis of a motion vector of the object related to the feature region and determine the reference region on the basis of the calculated center point of gravity of the object, and
wherein the one or more processors determine a region in a vicinity of a point obtained by weighting the center point of gravity as the reference region if a type of the object is a first type, and determine a region in the vicinity of the center point of gravity as the reference region if a type of the object is a second type.

2. The imaging device according to claim 1, wherein the one or more processors determine the feature region on the basis of information on a size of a region corresponding to the object.

3. The imaging device according to claim 1, wherein the one or more processors acquire an angle formed by the object and the imaging device as information on the moving direction, and determine the feature region of the object according to a size of the acquired angle.

4. The imaging device according to claim 3, wherein the one or more processors determine the feature region if an analysis result of the acquired angle indicates that the object has passed a front of the imaging device.

5. The imaging device according to claim 4, wherein the one or more processors determine the feature region if a size of the acquired angle and a sign of the angle indicate that the object has passed the front of the imaging device.

6. The imaging device according to claim 4, wherein the one or more processors determine the feature region if a size of an angular acceleration and a sign of the angular acceleration calculated on the basis of the acquired angle indicate that the object has passed the front of the imaging device.

7. The imaging device according to claim 3, wherein, if the acquired angle is less than a threshold value, the one or more processors determine the feature region according to an operation of a user or selection of a region based on registration information of the reference region stored in advance in a unit configured for storage.

8. The imaging device according to claim 7, wherein the one or more processors further execute an instruction to cause an image processing apparatus to display the feature region in a selectable manner.

9. The imaging device according to claim 3, wherein the one or more processors acquire an angle formed by the object and the imaging device on the basis of an object velocity, an object distance, and a movement time between two points of the object.

10. The imaging device according to claim 3, wherein the one or more processors acquire an angle formed by the object and the imaging device on the basis of a motion vector and a focal length of the object.

11. The imaging device according to claim 3, wherein, if an analysis result of the acquired angle does not indicate that the object has passed a front of the imaging device, the one or more processors drive a correction unit on the basis of angular velocity information of the object determined on the basis of a motion vector of a focus detection region to correct the image blur related to the object.

12. The imaging device according to claim 1, wherein a size of a region corresponding to the object is determined on the basis of a detection result of a type and a portion of the object based on learnt data included in information on the size of the region corresponding to the object, and a pixel size of an imaging sensor.

13. The imaging device according to claim 1, wherein a size of a region corresponding to the object is determined on the basis of an in-focus frame determined with a depth of field in a focus detection region included in information on the size of the region corresponding to the object as a reference.

14. The imaging device according to claim 1, wherein the object is at least any moving body of a car, a ship, or an aircraft.

15. The imaging device according to claim 1, wherein the one or more processors determine a region in a vicinity of a point on a lower side in a vertical direction of the center point of gravity as the reference region if a type of the object is a formula car, and determine a region in the vicinity of the center point of gravity as the reference region if a type of the object is a touring car.

16. The imaging device according to claim 1, wherein the one or more processors do not calculate the center point of gravity of the object if a size of a region corresponding to the object is not within a predetermined range.

17. The imaging device according to claim 1, wherein the one or more processors further execute an instruction to cause an image processing apparatus to drive a correction unit on the basis of angular velocity information of the object determined on the basis of a motion vector of the reference region to correct the image blur related to the object.

18. A control method of an imaging device comprising:
first determining of determining a feature region of an object according to information on a moving direction of the object with respect to an imaging device; and
second determining of determining a reference region for correcting image blur related to the object on the basis of a motion vector of the object related to the feature region obtained on the basis of a motion between a plurality of images, calculating a center point of gravity of the object on the basis of a motion vector of the object related to the feature region and determine the reference region on the basis of the calculated center point of gravity of the object; and third determining of determining a region in a vicinity of a point obtained by weighting the center point of gravity as the reference region if a type of the object is a first type, and determining a region in the vicinity of the center point of gravity as the reference region if a type of the object is a second type.

19. An imaging device comprising:

one or more processors configured to execute instructions which, when executed by the one or more processors, cause the imaging device to:

detect a motion between different images as a motion vector;

determine a feature region of an object according to information on a moving direction of the object with respect to the imaging device; and determine a reference region for correcting image blur related to the object on the basis of a motion vector of the object related to the feature region, wherein a size of a region corresponding to the object is determined on the basis of a detection result of a type and a portion of the object based on learnt data included in information on the size of the region corresponding to the object, and a pixel size of an imaging sensor.

20. An imaging device comprising:

one or more processors configured to execute instructions which, when executed by the one or more processors, cause the imaging device to:

detect a motion between different images as a motion vector;

determine a feature region of an object according to information on a moving direction of the object with respect to the imaging device; and determine a reference region for correcting image blur related to the object on the basis of a motion vector of the object related to the feature region, wherein a size of a region corresponding to the object is determined on the basis of an in-focus frame determined with a depth of field in a focus detection region included in information on the size of the region corresponding to the object as a reference.

21. A control method of an imaging device comprising:

first determining of determining a feature region of an object according to information on a moving direction of the object with respect to an imaging device; and second determining of determining a reference region for correcting image blur related to the object on the basis of a motion vector of the object related to the feature region obtained on the basis of a motion between a plurality of images, wherein a size of a region corresponding to the object is determined on the basis of a detection result of a type and a portion of the object based on learnt data included in information on the size of the region corresponding to the object, and a pixel size of an imaging sensor.

22. A control method of an imaging device comprising:

first determining of determining a feature region of an object according to information on a moving direction of the object with respect to an imaging device; and second determining of determining a reference region for correcting image blur related to the object on the basis of a motion vector of the object related to the feature region obtained on the basis of a motion between a plurality of images, wherein a size of a region corresponding to the object is determined on the basis of an in-focus frame determined with a depth of field in a focus detection region included in information on the size of the region corresponding to the object as a reference.

* * * * *